April 24, 1962 C. W. GALEN 3,031,654
INDICATING MECHANISMS
Filed April 9, 1956 3 Sheets-Sheet 1

INVENTOR.
CLARENCE W. GALEN
BY
Fearman & Fearman
ATTORNEYS

April 24, 1962

C. W. GALEN 3,031,654

INDICATING MECHANISMS

Filed April 9, 1956

*INVENTOR.*
CLARENCE W. GALEN
BY
Searman & Searman
ATTORNEYS

April 24, 1962  C. W. GALEN  3,031,654
INDICATING MECHANISMS

Filed April 9, 1956  3 Sheets-Sheet 3

INVENTOR.
CLARENCE W. GALEN
BY
*Fearman & Fearman.*
ATTORNEYS

United States Patent Office 3,031,654
Patented Apr. 24, 1962

3,031,654
INDICATING MECHANISMS
Clarence W. Galen, R.F.D. 8, Box 461,
Battle Creek, Mich.
Filed Apr. 9, 1956, Ser. No. 577,055
17 Claims. (Cl. 340—309.1)

This invention relates to indicating mechanisms and more particularly to an instrument designed to record the length or extent of a number of menstrual cycles or other cycles and to thereby predict the fertile or critical period during a current cycle.

Various calendars and the like have been proposed which supposedly would indicate fertile and sterile periods in a menstrual cycle if properly operated. Such calendars have, so far as I know, been based on statistical data rather than any actual mechanically recorded experience of the particular woman using the calendar. It has been determined that the great majority of women have menstrual cycles ranging from 25 to 31 or 32 days and that the period of days during the cycle within which ovulation is expected to occur will vary dependent on the length of the cycle. A calendar which must take into consideration all of the possible variations in length of such cycles as well as the different periods during which the woman may be fertile will necessarily indicate that the woman is fertile for an unduly long period. Further, women whose cycles do not fall within the cycles adopted by these calendars which tend to limit the range of cycles used in order that they may indicate the fertile period more accurately cannot use the calendars.

One of the prime objects of the instant invention is to provide an instrument which permits a woman to more accurately pinpoint her fertile period by predicting it on the basis of her most recent cycles.

A further object of the invention is to provide an indicator which can be used by women having cycles of abnormal length as well as by women whose cycles are of relatively average length.

Another object of the invention is to obviate the use of complex and confusing calenders which are difficult to operate properly without error by providing an instrument which is virtually automatic in that the only operation the woman need perform is to simply return the dial to day 1 when menstruation occurs.

A further object of the invention is to provide an instrument which can be used with ease, accuracy, and confidence by women who for physiological, religious, or economic reasons must know the fertile and sterile days of their menstrual periods.

A still further object of the invention is to design an indicating instrument which is attractive in appearance, compact, durable in construction and which can be relatively economically manufactured and assembled.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

Basically the operation of the instrument is based on the established physiological fact that conception will occur in any one menstrual cycle within a predictable five day period. During a 28 day cycle, for example, it has been established that ovulation occurs between the eleventh and fifteenth days. In a 29 day cycle ovulation occurs between the twelfth and sixteenth days, and during a 27 day cycle ovulation occurs between the tenth and fourteenth days. The device employs a series of cycle plates mounted on a rotary dial shaft so as to be themselves revolvable thereon. Mechanism is associated with these cycle plates which positions one of them on the shaft during each cycle in accordanec with the length of that cycle. When the plates come into engagement with a bank of contacts then the predicted fertile period is determined by the length of the woman's most recent cycles.

Figure 1:
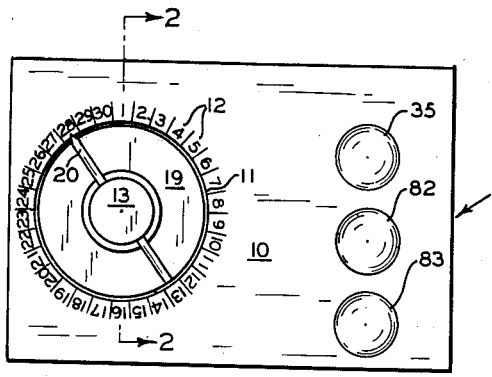
FIG. 1 is a side elevational view of the instrument showing the cycle indicia thereon and the dial which designates the particular day of the cycle.

Referring now more particularly to the accompanying drawings, wherein I have shown preferred embodiments of the invention, a letter C generally indicates the casing or housing of my indicating unit which may be oblong in form as shown and fabricated of plastic or any other suitable material. The housing has a removable front wall 10 provided with an annular opening 11 around which are provided circumferentially disposed indicia 12 which indicate days in a menstrual cycle. While in the instant case the indicia number from one to thirty for the sake of convenience of illustration, it should be understood any number of days could have been depicted.

Mounted within the casing is my recording and indicating unit which has a dial 13 cooperating with the indicia 12. The dial 13 is fixed on the front end of a shaft 14 which is journaled in the front and rear walls 15 and 16 of a rectangularly shaped frame F. The dial 13, which is separated from the wall 15 of the frame F by a washer 17 with a radial extension 18, has an annular base 19 adapted to be received within the opening 11 in the wall of the casing, and formed integrally with the base 19 is a projecting referece bar 20.

Figure 2:
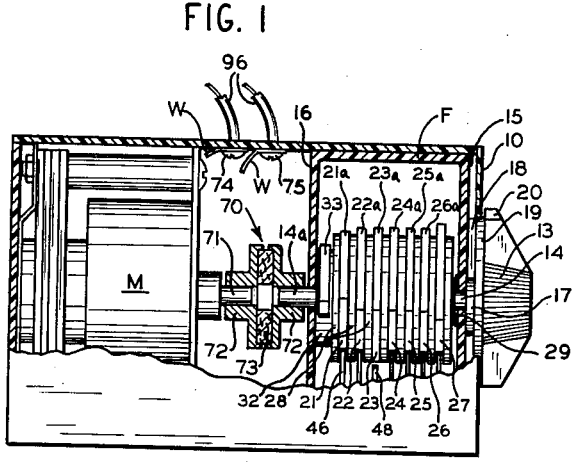
FIG. 2 is a transverse view partly in section taken on the line 2—2 of FIG. 1.
Figure 4:
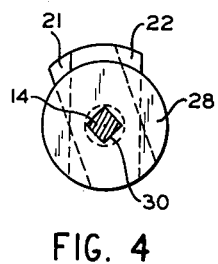
FIG. 4 is an enlarged side elevational view showing the manner in which the friction discs are mounted on the dial shaft.
Figure 5:
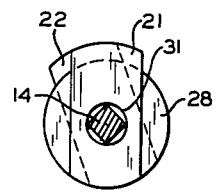
FIG. 5 is a similar view showing the manner in which the cycle plates are mounted on the dial shaft.
Figure 6:
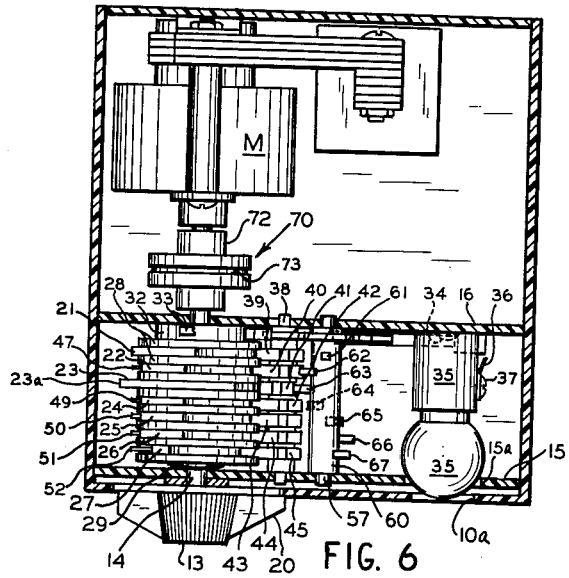
FIG. 6 is a sectional top plan view showing the operating mechanism within the casing taken with the cycle plates set in a normal position and the dial indicator bar at numeral 13.

As best illustrated in FIGS. 2 and 6 a series of conductive, metallic eccentrics or cycle plates 21–27 are rotatably mounted on the shaft 14 between conductive metal clutch discs 28 which are fixed to the shaft and a tension washer 29 is provided on shaft 14 so that sufficient friction is created between said discs 28 and plates 21–27 that they normally revolve as a unit when the shaft 14 is rotated. The section of the shaft 14 on which the plates 21–27 are mounted may be square in cross section as shown in FIGS. 4 and 5 and the openings 30 in the discs 28 may be similarly square, while the openings 31 in the plates 21–27 are annular so that the plates can revolve on the shaft. The plates or eccentrics 21–27 (seven are shown but obviously more or less could be provided) have arcuate ends as shown in FIGS. 4 and 5 which terminate so as to be flush with the discs 28 at one end of each plate but project beyond the discs 28 at their opposite ends as at 21a–27a.

Mounted on the shaft 14 in engagement with the rear disc 28 is a conductive, metallic washer 32 and a thin gauge conductive strip 33 soldered or otherwise fixed to the washer 32 leads to a terminal 34 fixed on an indicator or pilot bulb 35 in this first embodiment of the invention as shown. Openings 15a and 16a are provided in the walls 15 and 16 so that the bulb 35 will be visible outside the casing C. One of a pair of power leads 36 also connects to the light at terminal 37 and the second power lead 36a connects to still another terminal 37a.

Figure 7:
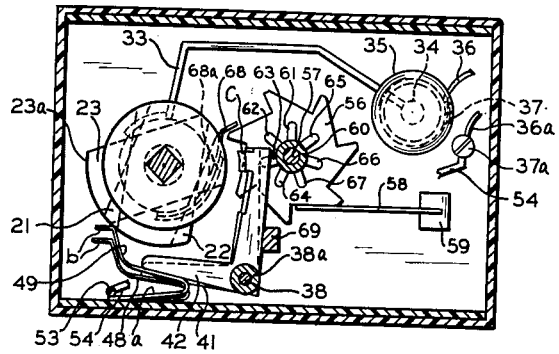
FIG. 7 is a sectional, side elevational view taken with the dial at the same setting.
Figure 10:
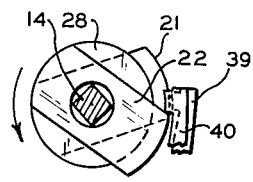
FIG. 10 is a similar view illustrating how the next successive lever halts the successive cycle plate when the dial is being returned counterclockwisely to day one so that during the cycle to follow the plate to be set will be in advanced position relative to the other plates.

Pivotally mounted on a pin or shaft 38 are a bank of non-conductive, individual, bell crank levers 39–45 which are spaced by washers 38a so as to be in lateral registry with the cycle plates 21–27. The levers 39–45 have individual, conductive spring contacts 46–52 in association therewith which are spaced apart sufficiently that they do not engage at any point. As best illustrated in FIG. 7 the contacts 46–52 are soldered or otherwise fixed to a conductive pin 53 which is supported by the frame F and include loop portions "a" which bear on the adjacent ends of the levers 39–45 and contact feet "b" adapted to normally engage the end portions 21a–27a of the plates 21–27. In normal position the feet "b" will be so disposed that they would be engaged by the ends 21a–27a of the plates (note the position of contact 49 in FIG. 7) but would not be engaged by the opposite ends of the plates or by the discs 28. As will later be evident, however, any one of the contacts 46–52 can be moved outwardly by its companion bell crank lever so that its foot "b" will be disposed outwardly of the path of the projecting end of the adjacent cycle plate (note the position of spring 48 in FIG. 7).

The opposite ends of the bell crank levers 39–45 have radial projections "c" thereon which are normally outward of the rotary path of the projecting ends 21a–27a of the plates 21–27 but may be pivoted into their path in a manner which will presently become apparent. When one of the radial projections "c" is moved into the path of the extended end of a cycle plate (note bell crank lever 41 in FIG. 6) the companion spring (48 in FIG. 7) which bears on the opposite leg of the bell crank lever is moved out of the path of the projecting end of the particular cycle plate so that there is no contact between the spring and plate when the latter revolves by the spring.

Figure 8:
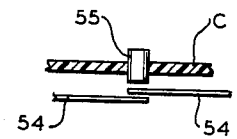
FIG. 8 is a side elevational view illustrating an operating button which can be depressed to close the indicating circuit.

To complete the circuit from the elongated contact springs 46–52 which are in normal position in the path of the cycle plates, a contact strip 54 cemented to wall 16 leads from the pin 53 to the terminal 37a on the wall 16. The strip 54 may comprise a pair of spaced apart, overlapping sections (see FIG. 8) which can be closed by a push button 55 if it is deemed undesirable for the bulb 35 to be continuously energized during the fertile period of the cycle. In either case the indicating means is considered "activated" during the fertile portion of the cycle even if button 55 must still be pushed to light bulb 35. The fertile period of the cycle is that period during which any of the contacts 46–52 are in engagement with their companion cycle plates 21–26. In the embodiment of the invention which is shown a motor M (FIG. 2) moves the shaft 14 through one thirtieth of a revolution during each twenty-four hour interval. At the end of thirty days the pointer bar 20 on the dial 13 has completed a single revolution.

In order to sequentially position the cycle plates 21–27 on the shaft 14 in accordance with the length of the prior menstrual cycles they represent, a ratchet wheel 56 is fixed on a pin or shaft 57 which is journaled in the front and rear walls 15 and 16 of the frame F. A flexible stop 58 fixed in a block 59 on rear wall 16 permits rotation of the wheel in only a clockwise direction (as viewed in FIG. 7). Also fixed on the shaft 57 is a selector sleeve 60 which has a plurality of circumferentially and laterally spaced, spirally arranged teeth or projections 61–67 thereon arranged in lateral registry with the adjacent ends of the bell crank levers 39–45. One of the projections 61–67 is at all times in engagement with one of the adjacent ends of one of the levers 39–45 and displacing it inwardly to thereby stop one of the cycle plates at a particular point in the cycle while permitting the other cycle plates to proceed. In FIG. 7, for example, projection or tooth 63 has forced the end of lever 41 inwardly so that the end 23a of cycle plate 23 will be stopped by the lever 41 while the other plates are free to move past the plate 23. A pawl 68 which is reinforced as at 68a is fixed on the washer 32 and revolves the ratchet wheel through one-seventh of a revolution on every return (counterclockwise) revolution of the shaft 14 to withdraw the one engaged projection (61–67) and move the next projection circumferentially into engagement with its companion bell crank lever. When one of the projections (61–67) is revolved sufficiently so as to be out of stopping engagement with its companion crank lever, the particular contact spring which is associated with that lever returns the bell crank lever to original position. A stop bar 69 limits this return travel of the bell crank levers so that they will be in position to be engaged by the selector sleeve projections in proper order once again.

The motor M which is provided in the casing to drive the shaft 14 may be of any suitable type and must, of course, be geared down so as to revolve the shaft through but one thirtieth of a revolution during each twenty-four hour interval. A motor designated Type H5 which is manufactured by Telechron Inc. of Ashland, Mass., may be employed as may be motors such as disclosed in Patents Nos. 2,353,305 or 2,334,040, and a friction coupling 70 will be employed to connect the drive shaft 71 of the motor with the rear end 14a of the shaft 14. Thus when the shaft 14 must be reversed and turned back at the end of a cycle the coupling sleeves 72 which are fixed to the respective shafts will slip on the intermediate friction member 73 so that there is no damage to the motor M. Wires W, for connection to a power source, lead from the motor M to terminals 74 and 75 as do the lead wires from the bulb 35 and outside wires 96 will have a plug thereon which may be connected into a socket in the home. If the motor M is temporarily inoperative, or no motor is employed with the mechanism, the shaft 14 can, of course, be actuated manually by simply moving the dial 13 ahead one digit each day. Also, batteries could be provided in the bulb (35) circuit in place of the power wires 36 if more convenient.

Figure 3:
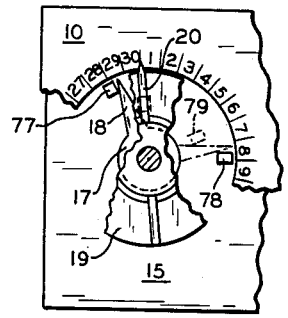
FIG. 3 is a fragmentary, side elevational view similar to FIG. 1 with the dial partly broken away to show stop means for limiting rotation of the dial in both directions.

Provided on the front wall 15 of the frame F to limit counter clockwise movement (in FIG. 3) of the dial 13 to substantially a return to initial position at the indicia numeral 1 from its clockwise movement is a stop 77 disposed in the path of the radial extension 18 of the washer 17 which, while free to rotate relative to the shaft 14 normally rotates therewith. Likewise a stop 78 is provided on the wall 15 on the opposite side of numeral 1 and a lug 79 is provided on the base of the dial radially inward of both stops 77 and 78. Assuming that the pointer bar 20 on the dial 13 is clockwise of the extension 18 (as in FIG. 3) the dial can be moved through an entire revolution in a clockwise direction. The extension 18 will move with the dial until it is halted by stop 78 at substantially the indicia numeral 8. Thus the dial can from initial position turn through about one and one quarter revolutions whence the lug 79 will engage the extension 18 which has been halted by the stop 78. The maximum cycle which can be recorded by the instrument is then 38 days.

Figure 9:
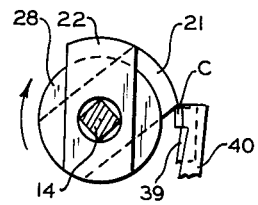
FIG. 9 is an enlarged fragmentary, side elevational view illustrating the manner in which the one bell crank lever which is displaced inwardly during each cycle halts rotation of one of the cycle plates at a predetermined point and sets it relative to the other plates.

To set the instrument initially so that the positions of six of the cycle plates will be in accordance with the length of the last six menstrual cycles is a very simple matter. The cycle plates are arranged by the manufacturer in parallel relation set with the projecting ends 21a–27a of the plates located behind the contact springs 46–52 (clockwisely speaking) at a position representing, for example, a 25 day cycle. The ratchet wheel 56 is in a position whereby radial tooth 61 is displacing bell crank lever 39 so that its projection "c" is disposed in the path of the end 21a of cycle plate 21 and contact spring 46 is moved outwardly of the path thereof. If the dial is now moved through 28 days which will be assumed to have been the length of the cycle six months ago the plates 22–27 will revolve with the dial through the entire cycle however the eccentric end of plate 21 which is in advanced position relative to the other plates for a reason which will later be apparent will be stopped after traveling some distance by the projection of lever 39 (FIG. 9). The plate 21 has thus been located relative to the remainder of the plates 22–27 and spring 46 for a 28 day cycle and will remain so located when the dial is returned counterclockwisely to initial position. When the dial 13 and cycle plates 22–27 are returned counterclockwisely to initial position, the plate 21 will be located a spaced distance clockwisely behind the contact spring 46. When the dial was moved clockwisely through the cycle, the pawl 68 moved with the washer 32 to which it is fixed and the pawl 68 slipped over the tooth of the ratchet wheel in its path which was held by stop bar 58. On the return trip in a counterclockwise direction the pawl 68 pushed the tooth sufficiently to turn the ratchet wheel through one-seventh of a revolution and the end of the lever 39 was moved out of the path of the end 21a of the cycle plate 21 by the contact spring 46. The foot 46b of the spring 46 returned to a position in which it will be contacted by the projecting end 21a of cycle plate 21. When the lever 39 was returned to normal the tooth 62 forced the second lever 40 to pivot such that the projection "c" thereon was disposed in the path of the end 22a of cycle plate 22 and the spring 47 was removed from the path of the plate. Since the wheel 56 was moved one tooth before plate 21 reached the end c of lever 61 plate 21 can move past lever 61 which was returned to normal position and will not be disturbed from its set position. Plate 22 will however be held by the end c of lever 40 which is now in "in" position and when the dial is next turned clockwisely the cycle plate 22 which will not contact spring 47 is in advance of the other plates so as to be sure to be set even though the next cycle is shorter than the cycle plate 22 represents. When the dial 13 is turned clockwisely through a second cycle of 29 days, for example, contact will be made between spring 46 and the projected end 21a of cycle plate 21 during the period when the dial indicator is passing between cycle days 11–15 and, if the button 55 is pressed any time during this period, the bulb 35 will light to indicate that the woman is in the fertile portion of her cycle. The cycle plate 22 will, of course, similarly be halted by lever 40 as the plates 21 and 23–27 are being rotated through the entire cycle and, when these latter plates are returned, plate 22 will be positioned similarly to plate 21 but slightly behind it clockwisely because the menstrual cycle was longer. If the cycle had been shorter than 28 days the plate would have been slightly ahead (clockwisely) of the plate 21, of course. On the return of the dial 13 the tooth 62 is similarly revolved out of the path of the lever 40 and the spring 47 returns the lever to normal position. When the dial 13 is now rotated through a third cycle, contact will be made between the projected end 21a of plate 21 and spring 46 during days 11–15 and between the projected end 22a of plate 22 and spring 47 during cycle days 12–16. Thus if the button 55 is pressed any time during the period from cycle day 11 to cycle day 16 the bulb 35 will light. If the dial is revolved through a third menstrual cycle of 27 days the cycle plate 23 will be set by the lever 41 so that on the fourth cycle the end 23a of plate 23 will be in engagement with spring 48 during cycle days 10–14. Accordingly, if the button 55 is pressed any time during the period from cycle day 10 to cycle day 16 the bulb will light. The 4th, 5th, and 6th cycles are similarly recorded by positioning plates 24, 25, and 26 and these plates will be located in the same general area as plates 21–23 when the recording has been completed. The plates 21–26 are now positioned in accordance with the woman's last six cycles with disc 26 being positioned according to the length of the most recent cycle. The instrument is now "set" and can be plugged into a convenient source of power.

Plate 27 will represent the current or seventh cycle and during this cycle, plate 27 is, of course, held out of the circuit while the fertile period is determined by plates 21–26. At the end of the current cycle the woman returns the dial counterclockwisely and the lever 39 is again pressed into the path of plate 21 by the radial projection 61. Plate 21 will then be set once again during the succeeding "current" cycle in accordance with the length of the cycle. At any one time during a given cycle, six cycle plates are disposed in the path of their companion springs while the seventh spring is outward of the path of the remaining plate. Thus the instrument is responsive to the six previous menstrual cycles. The only operation which need be performed by the woman using the instrument is to return the dial to initial position at day 1 at the end of each cycle. If she forgets to do so for a day or two the result will only be to temporarily lengthen the fertile period indicated by the instrument.

The instrument can be initially set as above described if the woman knows the length of her six previous cycles. If she does not, she can, of course, easily set all of the cycle plates initially to reflect her extreme cycles.

Figure 11:
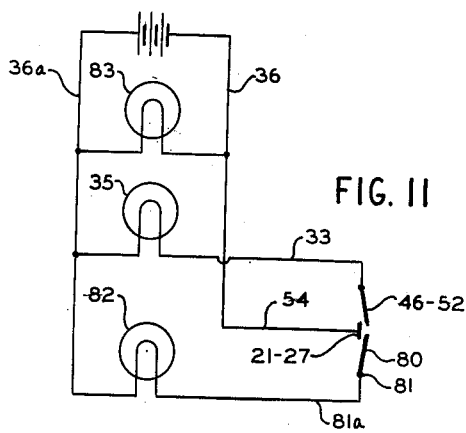
FIG. 11 is a schematic wiring diagram.
Figure 12:
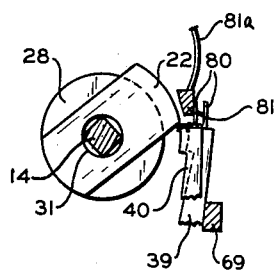
FIG. 12 is an enlarged, fragmentary plan view showing the contacts on the selector levers and a contact on their stop bar.

In FIG. 12 I have shown how individual contacts 80 are provided on each of the ends "c" of the non-conductive bell crank levers. These contacts do not appear in the other figures since it was felt they would complicate the views. When the levers are in normal position against stop bar 69 the contacts 80 are out of engagement with the continuous contact strip 81. The cycle plate (22 in FIG. 12) which will engage the inwardly displaced end of the one lever (40 in FIG. 11) does not, of course, come into contact with the particular contact 80 thereon until near the end of the cycle. When the plate does engage the contact as shown, the circuit to a pilot light 82 is made through the plate, the particular contact 80, the strip 81, and a lead strip 81a (see FIG. 12). Since the bell crank levers are non-conductive it makes no difference if the contacts 80 are all in conductive engagement even though one of them is displaced inwardly of the others. The light 82 indicates that the woman is near the end of her cycle. If desired a light 83 can be connected across the power input terminals 36 and 36a to indicate that power is being supplied to the instrument (FIG. 11).

Figure 15:
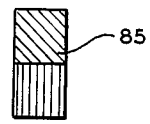
FIG. 15 is an enlarged end view of one of the said contact elements only.
Figures 13, 14:
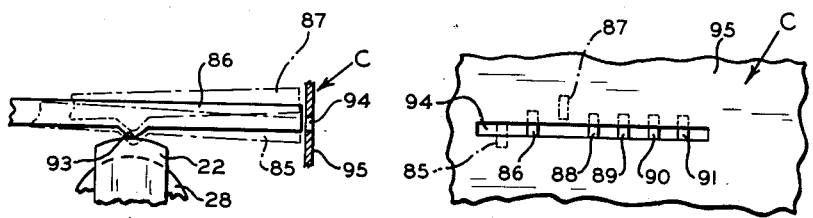
FIG. 13 is a fragmentary plan view illustrating a modification of the invention, the broken and diagrammatic lines illustrating different positions of a differing contact spring element.
FIG. 14 is an end elevational view illustrating the manner in which the different contact elements indicate the fertile and sterile periods.

In FIGS. 13-15 I have shown a modification of the invention in which spring bars 85-91 are provided in place of the spring contacts 46-52 and in this embodiment all of the pilot lights are omitted. Each of the bars 85-92 has a projection 93 arranged to ride on the raised end of the associated cycle plate. The end of each bar has an upper section colored green and a lower section colored red and a slit 94 is provided in the one end wall 95 of the casing c.

In normal position the spring bar is down as indicated by the broken lines in FIG. 13. The upper green half of the bar shows through the slit 94. When any one or more of the bars are displaced by the projected ends of the cycle plates (as shown by the full lines in FIG. 13) the lower red section of the particular bars is visible through the slit to indicate to the woman that she is in her fertile period. The end of the particular bar which is forced outwardly while its cycle disc is being set is not visible through the slit at all (note the diagrammatic lines in FIGS. 14). If a device of this type is manually actuated obviously no source of electric power is required for its operation.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. A method of mechanically indicating fertile and sterile periods in a menstrual cycle comprising the steps of, mechanically recording the length of more than a single prior cycle, and activating an indicator during a portion of a current cycle which is begun at the earliest fertile day of prior cycles and terminates at the latest fertile day of said cycles.

2. In an instrument for dividing a cycle of movement into portions and indicating during one of the portions of a cycle: a support housing; a shaft rotatable therein; a dial associated with said shaft, a reference element and a numerical scale on one of said dial and said housing surrounding said dial; a series of eccentric plates adjustable on said shaft circumferentially; members in the path of said plates; indicating means activated by said members; and means for automatically adjusting positioning one of said plates on said shaft in an advanced or retarded position relative to the other plates according to the extent of revolution of the shaft each time the shaft is revolved in a cycle to permit said plates to operate said members in accordance with the extent of prior cycles.

3. The combination defined in claim 2 in which said plates normally move with said shaft; and said latter means comprises a bank of levers in lateral alignment with said plates and means for moving a different one of said levers into the path of one of said plates to block movement thereof on each return rotation of said shaft to initial position.

4. The combination defined in claim 2 in which friction discs are provided between said plates fixed to said shaft so that said plates normally travel with said shaft; and said adjustment of said plates occurs when one of said plates is prevented from rotation with said other plates.

5. In an instrument for dividing a cycle of movement into portions and indicating during one of the portions of the cycle; a support housing including at least one visible opening therein; cycle plates movable through a path of movement in said housing; members movable to different positions relative to said opening moved by said cycle plates at predetermined locations in their path of movement; and indicating surfaces associated with said members exposed through said opening only when said members are in a particular position relative to said opening.

6. The combination defined in claim 5 in which friction plates between said plates normally cause said plates to move as a unit; and means for automatically adjusting the position of at least one of said plates relative to the other plates during the cycle of movement of said plates in accordance with the length of that particular cycle.

7. The combination defined in claim 6 in which the next successive plate to be adjusted is advanced in position relative to the other plates and the adjusted plate during return of said plates to original position prior to commencement of another cycle.

8. In an indicating instrument for dividing a cycle of movement into portions and indicating during one of the portions of the cycle; a housing; a shaft journaled therein; a dial fixed on said shaft having a reference element thereon; a numerical scale on said housing surrounding said dial; a plurality of elongated, conductive, cycle plates eccentrically mounted on said shaft to revolve thereon; conductive; friction discs fixed on said shaft normally causing said plates to move as a unit with said shaft; a bank of bell crank levers pivotally arranged in lateral alignment with said plates such that one leg of one of the levers may be moved into the path of its adjacent plate to halt movement thereof with said shaft; a bank of spring contacts bearing on the opposite legs of said levers in lateral alignment therewith and having portions thereof disposed in the path of the eccentric portions of said plates only; said contacts being disposed so that when one leg of a lever is moved into the path of the eccentric portion of a plate to halt its rotation with the other plates and adjust it relative thereto the spring contact in alignment therewith is moved out of the path of the said eccentric portion of the plate; a second shaft having spirally arranged; radial projections thereon in lateral alignment with said levers in position to selectively force one leg of one of said levers into the path of a plate; a ratchet on said second shaft; a pawl on said first shaft revolving said second shaft through part of a revolution on the return of said dial after completion of the cycle to cause the successive radial projection to move a successive lever into the path of a successive plate and permit the spring contact previously moved out of engagement with its plate to return its lever out of the path of its plate; and a circuit including an indicating element connecting the spring contacts with the discs and plates whereby said element is energized when any of the plates are in engagement with the contact springs.

9. The combination defined in claim 8 in which a conductive stop bar limits the return of said ends of the levers which have been in the path of said plates, said levers have conductors thereon connecting one with another, and a second indicating circuit is provided with an indicating element therein which is energized when one of said plates is engaged by one of said levers.

10. In an indicating instrument for dividing a cycle of movement into portions and indicating during one of the portions of the cycle; a housing; a shaft journalled therein; a dial fixed on said shaft having a reference element thereon; a numerical scale on said housing surrounding said dial; a plurality of elongated, cycle plates eccentrically mounted on said shaft to revolve thereon; friction disks fixed on said shaft normally causing said plates to move as a unit with said shaft; a bank of levers pivotally arranged in edge-to-edge alignment with said plates such that a part of one of the levers may be moved into the path of its adjacent plate to halt movement thereof with said shaft at a predetermined point in the cycle to be oriented with respect to the length of the cycle; a bank of members having portions thereof disposed in the path of the eccentric portions of said plates only; said housing having a slit therein and said members being pivotally mounted so that a particular portion thereof is visible through said slit when the members are in normal position; a second shaft having spirally arranged radial projections thereon in lateral alignment with said levers in position to selectively force parts of one of levers successively into the path of successive plates; a ratchet on said second shaft; a pawl on said first shaft revolving said second shaft through part of a revolution on the return of said dial after completion of the cycle to cause the successive radial projection to move a successive lever into the path of a successive plate; and indicator surfaces on said members of different color which when viewed through said slit in the housing indicates during a portion of said cycle responsive to the length of previous cycles.

11. In an instrument for dividing a cycle of movement into portions and indicating during one of the portions of a cycle; a support housing; a shaft rotatable therein; a bank of eccentric plates adjustable on said shaft circumferentially; members in the path of said plates; indicating means operated by said latter members; and means for automatically adjusting one of said plates successively on said shaft circumferentially according to the extent of revolution of the shaft each time the shaft is revolved in a cycle so that said plates operate said members in accordance with the extent of prior cycles.

12. The combination defined in claim 10 in which said latter means includes a bank of levers moved successively into position to halt one of the eccentric plates during the cycle of said shaft so that the extent of said cycle will be measured by the position of the said eccentric plate.

13. In an indicating instrument: indicating means; a frame; means cooperating with said indicating means comprising elements on said frame movable in paths of movement representing cycles; means for moving said elements in said cycles of movement; means operated by said last means for setting the position of at least one element in a relatively advanced or retarded position relative to another element in accordance with the extent of movement of said elements in a cycle of movement; and means interposed between said elements and indicating means activating said indicating means according to the positions of said elements during a particular portion of a cycle.

14. In an indicating instrument: indicating means; a frame; plural recording elements movable on said frame through cycles of movement; means setting the position of one of said recording elements relative to the others during each cycle of movement dependent on the extent of the movement; and means activating said indicating means during a portion of a cycle of movement of said recording elements only, with the duration of said movement during which said indicating means is activated dependent on the positions of said elements.

15. The combination defined in claim 13 in which said means for moving said elements comprises a shaft on which said elements are mounted; said elements comprise a plurality of eccentrics set circumferentially on the shaft in accordance with the length of prior menstrual cycles, and a plurality of operating elements associated with said eccentrics and contacted thereby during a portion of the cycle to operate said indicating means.

16. The combination defined in claim 14 in which said indicating means comprises a light bulb, and a circuit for said bulb including contact means, and said recording elements comprise eccentrics having engagement with the contact means during a predetermined portion of the cycle only.

17. The combination defined in claim 14 in which a housing is provided having a slit therein; said indicating means includes a bar with the portion thereof adjacent the slit separated into sections of different color; and said recording elements comprise rotatably mounted eccentrics having engagement with the bar during a predetermined portion of their rotation to adjust the bar relative to said slit and display a predesignated color at said slit.

References Cited in the file of this patent

UNITED STATES PATENTS

| | | |
|---|---|---|
| 844,074 | Woodward | Feb. 12, 1907 |
| 1,370,747 | Ide | Mar. 8, 1921 |
| 1,383,534 | Crook et al. | July 5, 1921 |
| 2,168,662 | Babcock | Aug. 8, 1939 |
| 2,176,438 | Steeneck | Oct. 17, 1939 |
| 2,238,756 | Steeneck | Apr. 15, 1941 |
| 2,348,141 | Luhn | May 2, 1944 |
| 2,517,793 | Lancaster | Aug. 8, 1950 |

FOREIGN PATENTS

| | | |
|---|---|---|
| 520,373 | Italy | Mar. 21, 1955 |
| 734,235 | Great Britain | July 27, 1955 |